Sept. 18, 1934. J. L. CREVELING 1,974,150
LUBRICATING DEVICE
Filed Nov. 9, 1932

INVENTOR.
JOHN L. CREVELING
BY
ATTORNEY.

Patented Sept. 18, 1934

1,974,150

UNITED STATES PATENT OFFICE 1,974,150

LUBRICATING DEVICE

John L. Creveling, near Tucson, Ariz., assignor to The Lubrication Corporation, South Bend, Ind., a corporation of Delaware Application November 9, 1932, Serial No. 641,855

6 Claims. (Cl. 285—25)

This invention relates to improvements in lubricating devices, and more particularly, to lubricant receiving nipples, or fittings, of the drive type.

Lubricant receiving fittings for automotive and other machinery bearings of a self-locking type have been devised. These fittings are fixed to the bearing or other part to be lubricated by inserting the fitting shank into the bore of the lubricant passage in the bearing and thereafter driving the fitting in the direction of its longitudinal axis, thereby to cause a shoulder formed on the fitting shank to displace the metal of the receiving member about its bore, or passage, into a groove or similar depression formed in the shank wall of the fitting below the drive shoulder. Such types of drive fittings, however, have necessitated the use of a special form of extraction tool to extract the fitting, as for repair or replacement.

An object of the invention is to provide a lubricant receiving fitting of the above described drive type which may be removed by the use of an ordinary mechanic's wrench, such as used to turn nuts upon bolts or similar threaded members.

Another object is to provide a drive type lubricant fitting which may be extracted from the bore, or passage, within which it is fixed, by turning the fitting about its axis, and without in any manner mutilating or otherwise rendering the walls of the bore, or passage, unfit for receiving another similar fitting.

A further object is to provide a drive type lubricant fitting affording a highly efficient lubricant tight seal between the fitting and receiving member, to prevent the leakage of lubricant therethrough when subjected to high pressures.

Other objects, advantages and uses of the invention, will be apparent after reading the following description and claims and after consideration of the accompanying drawing forming a part of this specification, in which:

Figure 1:
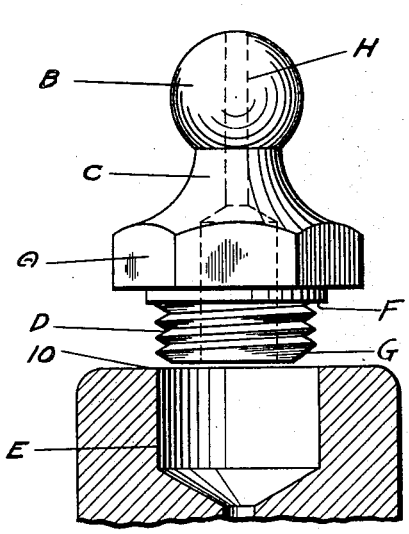
Fig. 1 is a side elevation of a lubricant fitting constructed in accordance with the invention, illustrating also the receiving member therefor prior to the driving of the fitting in place.

In general, the drive type lubricant fittings selected for illustration herein each comprise, a body portion A hexagonal in cross section, a spherical head B joined to the body by a tapering neck portion C, a shank D for introduction into the bore, or passage, E of a receiving member, or bearing, a drive shoulder F at the upper end of the shank D, and a thread G formed on the outer wall of the shank extending downwardly from the drive shoulder F, the root diameter of the thread being no less than the maximum diameter of the unthreaded portion of the shank. A lubricant passage H is provided longitudinally through the fitting, terminating preferably at the center of the spherical head B.

The drive fitting in all of the embodiments shown is formed with the body portion A adapted for engagement by a wrench of the common type employed by all automotive or machinery mechanics. The drive shoulder F is formed upon a diametrically enlarged portion of the shank D of lesser diameter than the body, joining the body portion A at its upper end, and presenting and annular work engaging drive surface at its lower end. The drive shoulder F is disposed in a plane perpendicular to the axis of the fitting and extends well beyond the outer portion of the thread G.

In preparing the receiving member for the fitting the bore, or passage, E is preferably formed to receive the threaded portion of the fitting shank D with as close a tolerance as may be had with the use of standard drills. Attention is here called to the unnecessity of employing a reaming tool to maintain closer tolerance than that obtained through use of a standard drill, as is often required with other types of drive fittings, particularly these wherein the fitting is held in place in the bore by friction.

After the bore E is formed in the receiving member, the shank D may be inserted therein until further movement is arrested by contact of the drive shoulder F with the upper surface 10 of the receiving member, whereupon a blow, or series of blows, delivered along the axis of the fitting, in the direction of the arrow 11, through the medium of a tubular drive tool 12 and an ordinary mechanic's hammer, will cause the drive shoulder F to engage with and displace metal of the receiving member into the grooves, or valley, of the thread G as indicated at 13. This metal displacing function of the drive shoulder F may be carried on until the body A abuts the surface 10 of the receiving member and the diametrically enlarged portion of the shank forming the drive shoulder is entirely within the expanded portion of the bore or recess E.

A close inspection of Figs. 2 to 5 inclusive, will reveal that, with the fitting in the position thus described, that metal of the receiving member forming the walls of the bore, or passage, has been caused to flow into the grooves, or valley, of the thread G in diminishing amounts as the thread progresses downwardly to securely hold the fitting in place upon the receiving member and to provide a lubricant tight seal therebetween.

To remove the fitting when secured upon a receiving member in the manner set forth, the operator may apply a mechanic's wrench to the hexagonal walled body A and rotate the fitting in a counter clockwise direction. This operation will cause the fitting shank to move out of the bore E in precisely the same manner as though the shank of the fitting were of the ordinary pipe threaded construction.

Figure 2:
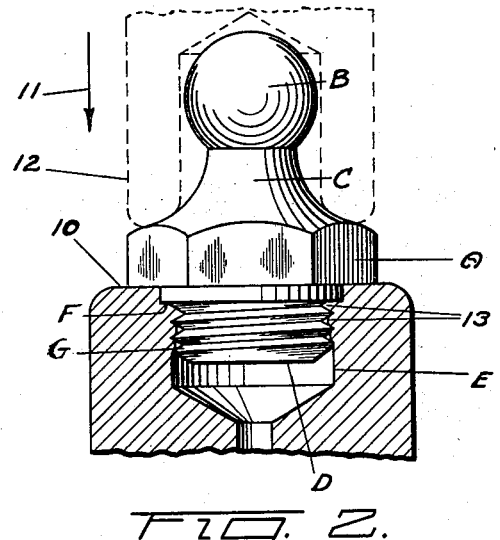
Fig. 2 is a side elevation of the fitting of Fig. 1, driven in place upon the receiving member.
Figure 3:
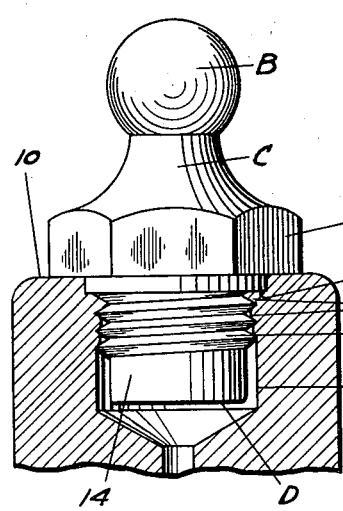
Figs. 3, 4 and 5 are views similar to Fig. 2 of other forms of the fitting embodying features of the invention.

In Fig. 3, the fitting is shown with a V thread of the same type employed on the fitting of Figs. 1 and 2, but has an elongated shank providing an unthreaded portion 14 extending downwardly beyond the lower turns of the thread D. Attention is called to the fact that the diameter of the unthreaded portion 14 of the shank is of no greater diameter than the root diameter of the thread G. This feature assures the removal of the fitting without mutilation of the inwardly extruded portion 13 of the walls of the receiving bore E and is present also in the fittings of Figs. 4 and 5.

Figure 4:
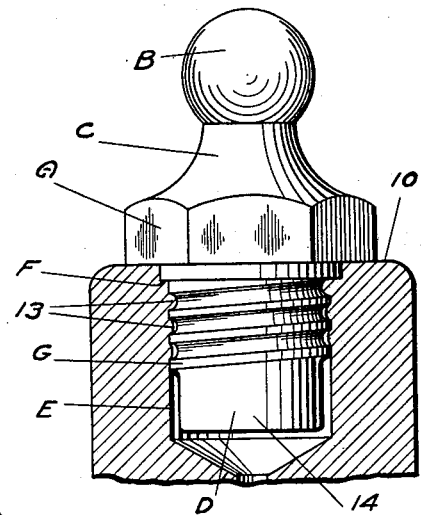

The fitting of Fig. 4 differs only from that of Fig. 3 in the formation of the thread G, which is fashioned to provide a concave cylindrical root wall, providing a relatively flat, narrow surface at the outer region of the thread. The advantage of this construction, as may be seen in the drawing, is the increased capacity between the threads for the reception of the extruded metal 13. In other respects, the use and function of the fitting is similar to those of the foregoing figures.

Figure 5:
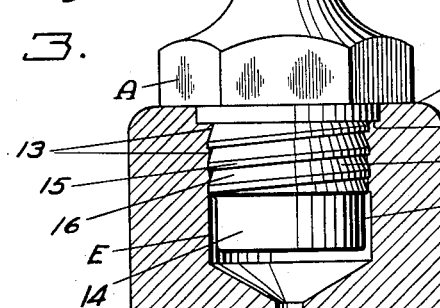

In Fig. 5, a fitting is shown which differs from that of Figs. 3 and 4 as to thread formation. In this form of the fitting the thread G is so constructed as to provide in itself a helical drive shoulder in addition to the drive shoulder F which becomes effective upon the displacement of metal 13 by the shoulder F as the fitting is driven in place. One wall 15 of the thread G of Fig. 5 lies in a helical plane perpendicular to the axis of the fitting and the remaining wall tapers outwardly as shown at 16. It is contemplated that in driving the fitting of Fig. 5 in place that the fitting be turned slightly between each blow upon the driving tool 12, thus inducing the wall 15 of the thread to assist in further displacement of the metal 13 into the grooves of the thread. The removal of the fitting may be carried out as in the case of the fittings of Figs. 1 to 4 by turning the fitting about its axis in a counter clockwise direction.

It is to be understood that the described embodiments of the invention herein set forth are presented for the purpose of illustration only and various changes may be made therein without departing from the spirit and scope of the invention.

I claim:

1. A lubricant receiving fitting of the drive type described, said fitting including, a shank adapted for reception within a bore, or passage, in a receiving member, a drive shoulder formed upon the upper portion of said shank for deforming the material of the receiving member, and a thread on said shank below said shoulder for engagement by and with the deformed material of the receiving member.

2. A lubricant receiving fitting of the drive type described, comprising, a shank adapted for reception within a bore in a receiving member, a drive shoulder formed upon the upper end of said shank for displacing metal of the receiving member, and a plurality of threads formed on said shank below said drive shoulder, said threads being formed to present, in cross section, a concavely arcuate root wall.

3. A lubricant receiving fitting of the type described, comprising, a shank adapted for reception within a bore of a metal receiving member, a drive shoulder formed upon the upper end of said shank for displacing metal of the receiving member, and a plurality of threads on said shank below said drive shoulder, said threads having one wall of each formed as a helical surface substantially perpendicular to the axis of the shank.

4. A lubricant receiving fitting of the drive type described, comprising, a shank adapted to be fixed in a bore in a receiving member, said shank having a thread thereon, said thread having one wall adapted to function as a drive shoulder for displacing metal of the receiving member toward the shank and into the thread as the fitting is driven inwardly of said bore.

5. A lubricant receiving fitting of the drive type described, said fitting including a shank adapted for reception within a bore of a receiving member, and a drive shoulder disposed in a plane perpendicular to the axis of said shank and formed upon the upper part of the shank for displacing metal of the receiving member, said shank being further formed with threads below said drive shoulder, the diameter of said drive shoulder being greater than the maximum diameter of said threads.

6. A lubricant receiving fitting of the drive type described and adapted to be fixed in a bore of a metal receiving member comprising, a body and a shank depending from said body, said shank having a drive shoulder formed thereon at its upper end for displacing metal of the receiving member, said shoulder being of greater diameter than the diameter of said bore, said shank being further formed with threads below said drive shoulder, said threads having a maximum diameter not greater than the diameter of said bore.

JOHN L. CREVELING.